P. W. MACKENZIE.
Improvement in Heaters and Condensers.

No. 123,570.

Patented Feb. 13, 1872.

Witnesses:

UNITED STATES PATENT OFFICE.

PHILIP W. MACKENZIE, OF BLAUVELTVILLE, NEW YORK.

IMPROVEMENT IN HEATERS AND CONDENSERS.

Specification forming part of Letters Patent No. 123,570, dated February 13, 1872; antedated January 25, 1872.

*To all whom it may concern:*

Be it known that I, PHILIP W. MACKENZIE, of Blauveltville, in the county of Rockland and State of New York, have invented a new and useful Improvement in Heaters and Condensers, of which the following is a full, clear, and exact description, reference being had to the accompanying drawing forming part of this specification, and in which—

Figure 1:
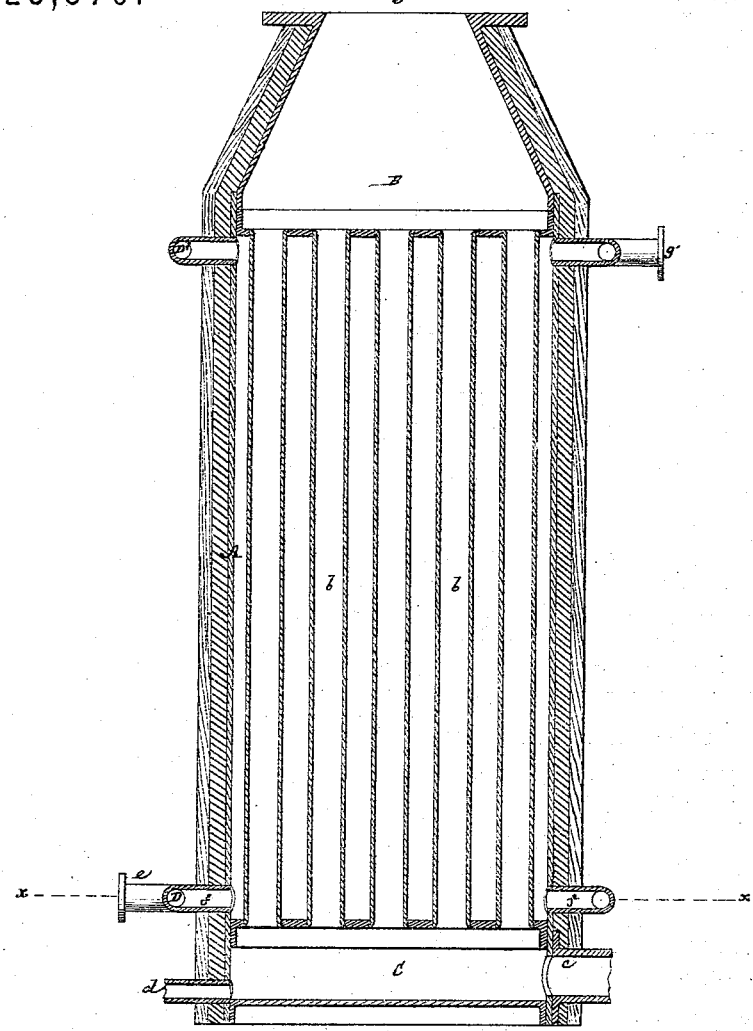
Figure 2:
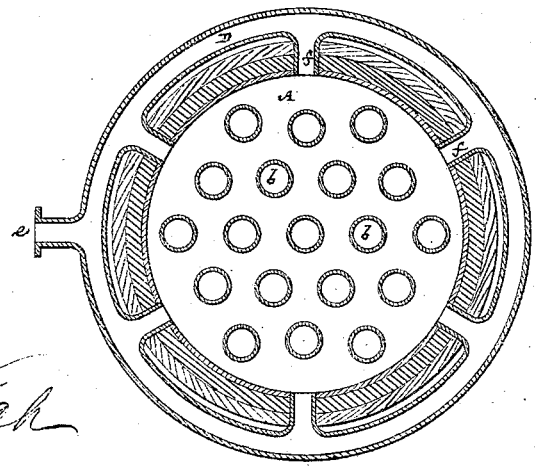

Figure 1 represents a central vertical section of a heater or condenser constructed in accordance with my improvement; Fig. 2, a horizontal section taken as indicated by the line $x$ $x$ in Fig. 1.

Similar letters of reference indicate corresponding parts in both figures.

My invention is applicable either to the heating or cooling and condensing of various fluids, vapors, and gases; and consists in a combination of parts, whereby the outside fluid is introduced to and passed off or from the tubular vessel or body at numerous and uniform points, which causes a more equable action generally, and equalizes the expansion and contraction of the tubes.

For the purpose of illustration it will suffice here to describe the invention as applied to the condensation of steam and the heating of the water, by which said condensation is effected.

Referring to the accompanying drawing, A represents the outer shell or body of the structure, which may be in the form of a vertical cylinder, and be suitably clothed to effect the desired results. Said body is fitted with any desired number of vertical tubes, $b$ $b$, through it, connecting with an upper chamber or cap, B, and lower chamber C. The steam to be condensed is introduced to the cap B and passes down through the tubes $b$ $b$, finally escaping, if any remains, by a branch, $c$, from the chamber C, while the water of condensation is drawn or passed off by a pipe, $d$. The water, by which condensation is effected, and which is heated by the act of condensation, is introduced, as by an inlet, $e$, into an outside or surrounding annular tube or hollow belt, D, arranged near the bottom of the vessel or body A, and communicating with the interior thereof by a series of branches, $f$, arranged uniformly, or thereabout, around the body, whereby the water is introduced at a series of points to act in an equable manner upon the several tubes in the body, and, passing upward among or around the tubes, is drawn off or allowed to overflow in like manner from the body A by an upper annular tube or belt, D', which similarly connects by branches at a series of points with the body A, and is provided with an outlet, $g$.

By this construction or combination of parts a perfect circulation or mixing of the water used to effect condensation is kept up, and the several tubes $b$ are equally exposed, or thereabout, whereby all agitation of the water in rising is prevented and the same caused to gradually ascend, growing hotter and hotter as it ascends, while the steam gets gradually cooler as it descends or simultaneously flows in a reverse direction to the water. In this way the steam gives out its greatest heat to the water at its highest elevation; and the equal exposure of the vertical tubes to a uniformity of temperature at any one level, together with their exposure to a gradually-increasing temperature in vertical direction, insures an equal expansion or contraction of the several tubes, and does away with all racking of them at their joints or end plates.

What is here claimed, and desired to be secured by Letters Patent, is—

The combination and arrangement of the annular tube or inlet-belt D and its branches or openings $f$ with the body A, tubes $b$, and outlet-belt or tube D', substantially as shown and described.

P. W. MACKENZIE.

Witnesses:
   FRED. HAYNES,
   FERD. TUSCH.